United States Patent
Zhu

(10) Patent No.: US 12,323,650 B2
(45) Date of Patent: Jun. 3, 2025

(54) METHOD AND APPARATUS FOR PROCESSING VIRTUAL VIDEO LIVESTREAMING, STORAGE MEDIUM AND ELECTRONIC DEVICE

(71) Applicant: TENCENT TECHNOLOGY (SHENZHEN) COMPANY LIMITED, Shenzhen (CN)

(72) Inventor: Shaoming Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 146 days.

(21) Appl. No.: 17/974,771

(22) Filed: Oct. 27, 2022

(65) Prior Publication Data

US 2023/0039789 A1 Feb. 9, 2023

Related U.S. Application Data

(63) Continuation of application No. PCT/CN2022/073997, filed on Jan. 26, 2022.

(30) Foreign Application Priority Data

Feb. 7, 2021 (CN) .......................... 202110169456.0

(51) Int. Cl.
*G10L 13/02* (2013.01)
*G10L 25/57* (2013.01)
(Continued)

(52) U.S. Cl.
CPC ........... *H04N 21/266* (2013.01); *G10L 13/02* (2013.01); *G10L 25/57* (2013.01);
(Continued)

(58) Field of Classification Search
CPC ............. H04N 21/266; H04N 21/2187; H04N 21/8106; H04N 21/8146; G10L 13/02; G10L 25/57
(Continued)

(56) References Cited

U.S. PATENT DOCUMENTS 10,283,163 B1 5/2019 Ulaganathan et al.
2013/0188887 A1* 7/2013 Chan ...................... G06V 30/40
382/312
(Continued)

FOREIGN PATENT DOCUMENTS

CN 109118562 A 1/2019
CN 109637518 A 4/2019
(Continued)

OTHER PUBLICATIONS

The World Intellectual Property Organization (WIPO) International Search Report for PCT/CN2022/073997 Apr. 8, 2022 7 Pages (including translation).
(Continued)

*Primary Examiner* — Alfonso Castro
(74) *Attorney, Agent, or Firm* — ANOVA LAW GROUP PLLC

(57) ABSTRACT

A method includes: receiving text data and motion data of a virtual object, the motion data including a motion identifier of a specified motion and a start position identifier of a start position that the specified motion starts being in line with text in the text data; generating audio data and expression data of the virtual object according to the text data, and generating facial images of the virtual object according to the expression data; generating a background image sequence containing the specified motion according to the start position identifier and the motion identifier, the background image sequence including at least one background
(Continued)

image; performing image fusion processing on the facial images and the at least one background image to obtain one or more live video frames; and synthesizing the live video frames with the audio data into a live video stream in real time.

20 Claims, 6 Drawing Sheets

(51) Int. Cl.
 *H04N 21/2187* (2011.01)
 *H04N 21/266* (2011.01)
 *H04N 21/81* (2011.01)
(52) U.S. Cl.
 CPC ..... *H04N 21/2187* (2013.01); *H04N 21/8106* (2013.01); *H04N 21/8146* (2013.01)
(58) Field of Classification Search
 USPC .......................................................... 725/105
 See application file for complete search history.

(56) References Cited

U.S. PATENT DOCUMENTS

2017/0270701 A1\* 9/2017 Okaniwa ............... G06F 40/289
2019/0050875 A1\* 2/2019 McCord ................ G06F 40/242
2021/0192824 A1\* 6/2021 Chen ....................... G06F 16/43

FOREIGN PATENT DOCUMENTS

| CN | 110688911 A | 1/2020 |
| CN | 110941954 A | 3/2020 |
| CN | 111010586 A | 4/2020 |
| CN | 111010589 A | 4/2020 |
| CN | 112333179 A | 2/2021 |
| CN | 113570686 A | 10/2021 |

OTHER PUBLICATIONS

China National Intellectual Property Administration (CNIPA) Office Action 1 for Application No. 202110169456.0 Mar. 17, 2025 13 Pages (including translation).

\* cited by examiner

METHOD AND APPARATUS FOR PROCESSING VIRTUAL VIDEO LIVESTREAMING, STORAGE MEDIUM AND ELECTRONIC DEVICE

CROSS-REFERENCE TO RELATED APPLICATIONS

This application is a continuation application of PCT Patent Application No. PCT/CN2022/073997, filed on Jan. 26, 2022, which claims priority to Chinese Patent Application No. 202110169456.0, entitled "METHOD AND APPARATUS FOR PROCESSING VIRTUAL VIDEO LIVESTREAMING, STORAGE MEDIUM AND ELECTRONIC DEVICE" and filed on Feb. 7, 2021, the entire content of all of which is incorporated herein by reference in their entirety.

FIELD OF THE TECHNOLOGY

The present disclosure relates to the field of video processing technologies, and specifically, to a method and an apparatus for processing a virtual video livestreaming, an electronic device, and a computer-readable storage medium.

BACKGROUND OF THE DISCLOSURE

With the development of the communication technology, the network communication bandwidth has been greatly improved, and the video livestreaming technology has been advanced and applied in all aspects. Meanwhile, with the development of the artificial intelligence technology, the text to speech (TTS) technology and the image synthesis technology have also become a research focus. The combination of the video livestreaming technology and the artificial intelligence technology can play a role in many aspects, such as replacing real people for virtual broadcast of news, replacing game anchors for virtual commentary of games, etc., thereby providing broad application prospects.

SUMMARY

Embodiments of the present disclosure provide a method for processing a virtual video livestreaming, an apparatus for processing a virtual video livestreaming, an electronic device and a computer-readable storage medium, thereby overcoming, at least to some extent, the problems that the existing virtual video livestreaming technology cannot specify a motion for a virtual object in a personalized mode, and there is a mismatch between a default motion of a virtual character and text.

According to one aspect of the present disclosure, a method for processing virtual video livestreaming is provided and includes: receiving text data and motion data of a virtual object, the motion data including a motion identifier of a specified motion and a start position identifier of a start position that the specified motion starts being in line with text in the text data; generating audio data and expression data of the virtual object according to the text data, and generating one or more facial images of the virtual object according to the expression data; generating a background image sequence containing the specified motion according to the start position identifier and the motion identifier, the background image sequence including at least one background image; performing image fusion processing on the one or more facial images and the at least one background image to obtain one or more live video frames; and synthesizing the live video frames with the audio data into a live video stream in real time.

According to one aspect of the present disclosure, an apparatus for processing a virtual video livestreaming is provided and includes: a data acquiring module, configured to receive text data and motion data of a virtual object, the motion data including a motion identifier of a specified motion and a start position identifier of a start position that the specified motion starts being in line with text in the text data; a facial image determining module, configured to generate audio data and expression data of the virtual object according to the text data, and generate one or more facial images of the virtual object according to the expression data; a background image determining module, configured to generate a background image sequence containing the specified motion according to the start position identifier and the motion identifier; an image fusing module, configured to perform image fusion processing on the one or more facial images and the at least one background image to obtain one or more live video frames; and a live video synthesizing module, configured to synthesize the one or more live video frames with the audio data into a live video stream in real time.

According to one aspect of the present disclosure, an electronic device is provided. The electronic device includes a processor and a memory, the memory storing computer-readable instructions, and the computer-readable instructions, when being executed by the processor, cause the processor to implement a method for processing a virtual video livestreaming. The method includes receiving text data and motion data of a virtual object, the motion data comprising a motion identifier of a specified motion and a start position identifier of a start position that the specified motion starts being in line with text in the text data; generating audio data and expression data of the virtual object according to the text data, and generating one or more facial images of the virtual object according to the expression data; generating a background image sequence containing the specified motion according to the start position identifier and the motion identifier, the background image sequence comprising at least one background image; performing image fusion processing on the one or more facial images and the at least one background image to obtain one or more live video frames; and synthesizing the one or more live video frames with the audio data into a live video stream in real time According to one aspect of the present disclosure, a non-transitory computer-readable storage medium storing a computer program, the computer program, when being executed, cause a processor to implement a method for processing a virtual video livestreaming. The method includes receiving text data and motion data of a virtual object, the motion data comprising a motion identifier of a specified motion and a start position identifier of a start position that the specified motion starts being in line with text in the text data; generating audio data and expression data of the virtual object according to the text data, and generating one or more facial images of the virtual object according to the expression data; generating a background image sequence containing the specified motion according to the start position identifier and the motion identifier, the background image sequence comprising at least one background image; performing image fusion processing on the one or more facial images and the at least one background image to obtain one or more live video frames; and synthesizing the one or more live video frames with the audio data into a live video stream in real time.

According to an aspect of this application, a computer program product or a computer program is provided, the computer program product or the computer program comprising computer instructions, the computer instructions being stored in a computer-readable storage medium. A processor of a computer device reads the computer instructions from the computer-readable storage medium, and the processor executes the computer instructions to cause the computer device to perform the method for processing a virtual video livestreaming provided in the foregoing various embodiments.

In the method for processing a virtual video livestreaming provided by an exemplary embodiment of the present disclosure, audio data and a facial image of a virtual object can be generated according to received text data, a background image containing a specified motion can be generated according to a received motion identifier and a start position identifier, and the facial image of the virtual object and the background image are subjected to image fusion processing to generate a live video frame; a live video stream can be synthesized in real time based on the live video frame and the audio data. On one hand, the motion data can be an object motion specified by a user for the virtual object, and the live video stream is generated according to the motion data, which can achieve the purpose of specifying a motion for the virtual object by the user in a virtual live video. On the other hand, a corresponding playing position of the specified motion and the text data is determined according to the motion identifier and the start position identifier, which makes the specified motion play at a specified position and can effectively solve the problem that motions of the virtual object do not match text.

It is to be understood that the foregoing general descriptions and the following detailed descriptions are merely for illustration and explanation purposes and are not intended to limit the present disclosure.

BRIEF DESCRIPTION OF THE DRAWINGS

The accompanying drawings herein, which are incorporated into the specification and constitute a part of this specification, show embodiments that conform to the present disclosure, and are used for describing a principle of the present disclosure together with this specification. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

Figure 1:
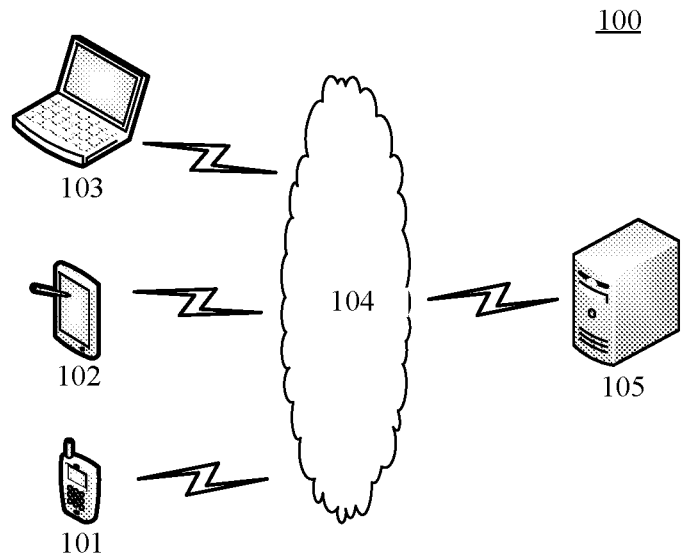
FIG. 1 shows a schematic diagram of an exemplary system architecture to for processing a virtual video livestreaming according to an embodiment of the present disclosure.

Exemplary implementations are now described more comprehensively with reference to the accompanying drawings. However, the exemplary implementations may be implemented in various forms, and are not to be understood as being limited to the examples described herein. Instead, the implementations are provided to make this application more thorough and complete and fully convey the idea of the exemplary implementations to a person skilled in the art. The described features, structures, or characteristics may be combined in one or more implementations in any appropriate manner. In the following description, many specific details are provided to give a full understanding of the implementations of this application. However, it is to be appreciated by a person skilled in the art that one or more of the specific details may be omitted during practice of the technical solutions of this application, or other methods, components, apparatus, steps, or the like may be used. In other cases, well-known technical solutions are not shown or described in detail to avoid overwhelming the subject and thus obscuring various aspects of this application.

In addition, the accompanying drawings are merely exemplary illustrations of the present disclosure and are not necessarily drawn to scale. The same reference numbers in the accompanying drawings represent the same or similar parts, and therefore, repeated descriptions thereof are omitted. Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include fields such as a computer vision technology, a speech processing technology, a natural language processing technology, machine learning/deep learning, and the like.

The solutions provided in the embodiments of this application relate to technologies as virtual video livestreaming processing of AI, which are specifically described by using the following embodiments.

FIG. 1 shows a schematic diagram of a system architecture of an exemplary application environment to which a method and apparatus for processing a virtual video livestreaming according to an embodiment of the present disclosure may be applied.

As shown in FIG. 1, a system architecture 100 may include one or more of terminal devices 101, 102, and 103, a network 104, and a server 105. The network 104 is a medium configured to provide a communication link between the terminal devices 101, 102 and 103 and the server 105. The network 104 may include various connection types such as wired and wireless communication links or fiber optic cables. The terminal devices 101, 102, and 103 may be various electronic devices with display screens, including but not limited to, desktop computers, portable computers, smartphones, tablet computers, and the like. It is to be understood that the quantities of terminal devices, networks, and servers in FIG. 1 are merely exemplary. There may be any quantities of terminal devices, networks, and servers according to an implementation requirement. For example, the server 105 may be a server cluster that includes a plurality of servers.

The method for processing a virtual video livestreaming provided in the embodiments of this application is generally performed by the server 105, and accordingly, the apparatus for processing a virtual video livestreaming is generally disposed in the server 105. However, those skilled in the art will readily understood that the method for processing a virtual video livestreaming provided by an embodiment of the present disclosure can also be executed by terminal devices 101, 102 and 103, and accordingly, the apparatus for processing a virtual video livestreaming can also be disposed in the terminal devices 101, 102 and 103, which is not particularly limited in this exemplary embodiment. For example, in an exemplary embodiment, it may be that a user uploads text data and motion data to a server 105 via the terminal devices 101, 102 and 103. The server generates audio data and a facial image of a virtual object according to the text data, generates a background image containing a specified motion according to the motion data, performs image fusion processing on the facial image and the background image to generate a live video frame, performs real-time synthesis processing on the live video frame and the audio data to generate a live video stream, transmits the live video stream to the terminal devices 101, 102 and 103, etc., via the method for processing the virtual video livestreaming provided by the embodiment of the present disclosure.

Figure 2:
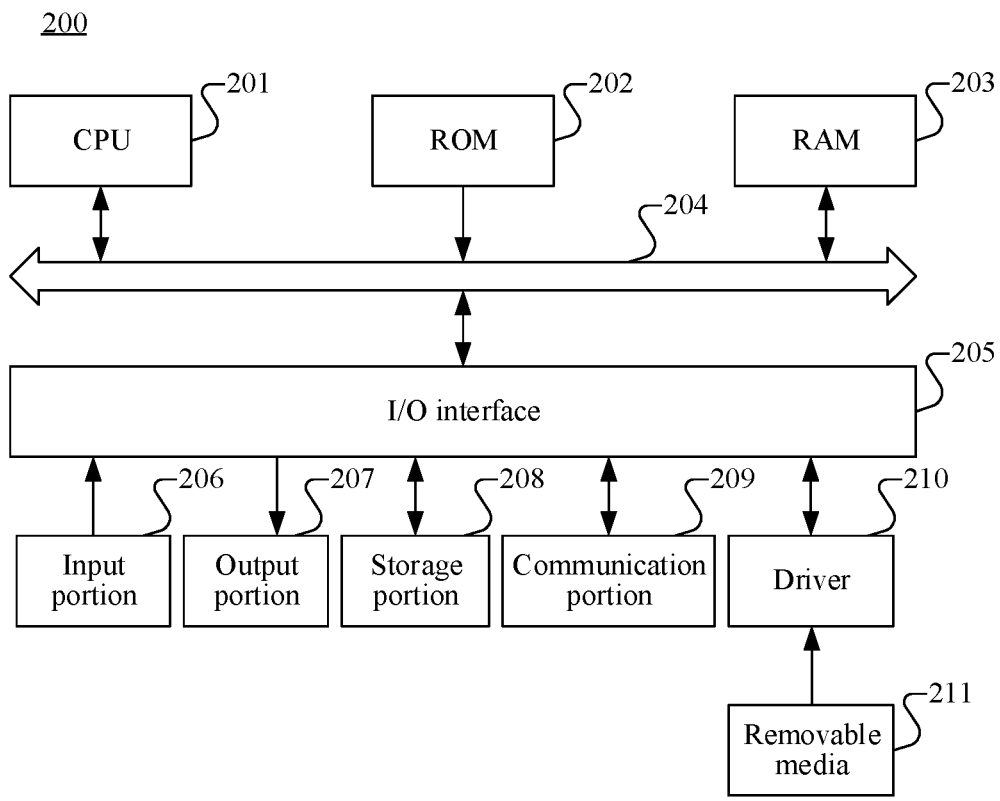
FIG. 2 shows a schematic structural diagram of a computer system adapted to implement an electronic device according to an embodiment of the present disclosure.

FIG. 2 shows a schematic structural diagram of a computer system adapted to implement an electronic device according to an embodiment of the present disclosure.

A computer system 200 of the electronic device shown in FIG. 2 is merely an example, and does not constitute any limitation on functions and use ranges of the embodiments of this application.

As shown in FIG. 2, the computer system 200 includes a central processing unit (CPU) 201, which may perform various proper actions and processing based on a program stored in a read-only memory (ROM) 202 or a program loaded from a storage part 208 into a random access memory (RAM) 203. The RAM 203 further stores various programs and data required for operating the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 comprising a cathode ray tube (CRT), a liquid crystal display (LCD), a speaker, or the like; a storage part 208 including a hard disk or the like; and a communication part 209 of a network interface card, including a LAN card, a modem, or the like. The communication part 209 performs communication processing by using a network such as the Internet. A drive 210 is also connected to the I/O interface 205 as required. A removable medium 211, such as a disk, an optical disc, a magneto-optical disc, or a semiconductor memory, is installed on the drive 210 as required, so that a computer program read from the removable medium 211 is installed in the storage part 208 as required.

Particularly, according to an embodiment of the present disclosure, the processes described below by referring to the flowcharts may be implemented as computer software programs. For example, an embodiment of the present disclosure includes a computer program product. The computer program product includes a computer program stored in a computer-readable medium. The computer program includes a program code used for performing a method shown in the flowchart. In such an embodiment, the computer program may be downloaded and installed through the communication part 209 from a network, and/or installed from the removable medium 211. When the computer program is executed by the CPU 201, various functions defined in the method and apparatus of this application are executed. In some embodiments, the computer system 200 may further include an AI processor. The AI processor is configured to process computing operations related to machine learning.

The computer-readable medium according to the present disclosure may be a computer-readable signal medium or a computer-readable storage medium or any combination of the two media. The computer-readable storage medium may be, for example, but is not limited to, an electrical, magnetic, optical, electromagnetic, infrared, or semiconductor system, apparatus, or device, or any combination thereof. More specifically, the computer-readable storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to, wireless transmission, a wire, a cable, radio frequency (RF) or the like, or any other suitable combination thereof.

The flowcharts and block diagrams in the accompanying drawings illustrate possible system architectures, functions, and operations that may be implemented by a system, a method, and a computer program product according to various embodiments of the present disclosure. In this regard, each box in the flowchart or the block diagram may represent a module, a program segment, or a part of code. The module, the program segment, or the part of code comprises one or more executable instructions used for implementing specified logic functions. In some implementations used as substitutes, functions marked in boxes may alternatively occur in a sequence different from that marked in an accompanying drawing. For example, actually two boxes shown in succession may be performed basically in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of the present disclosure may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the following embodiments. For example, the electronic device may implement the steps shown in FIG. 3 to FIG. 10.

The technical solutions of the embodiments of the present disclosure are described in detail in the following.

In the virtual video livestreaming technology, mainly, a corresponding live video stream is generated according to audios and images, and the live video stream is pushed to a client in real time. Generation of the audios and the images consumes a lot of computing time. In order to ensure the real-time performance of the virtual video livestreaming, implementation of real-time stream pushing of a virtual video is an important factor affecting the quality of a final live video.

Some real-time livestreaming methods of videos mostly aim at existing stable audio, picture data input (such as local video stream pushing), or application scenarios where audio and picture data (such as data acquired by a camera) can be fast acquired. On the premise that the real-time performance is not affected, most of these virtual video livestreaming technologies do not support the function that a user specifies motions for virtual characters, but use default motions provided by a service. In the virtual livestreaming scheme using the default motion, there may be a problem that the motion of the virtual character in the virtual video cannot be matched with the text, and the performance is unnatural. For example, the default motion of greeting is a beckoning motion performed by the virtual character. When text corresponding to the greeting is "welcome", there may be a problem that the motion does not match the text.

In addition, since the virtual character in the virtual livestreaming can only use the provided default motion, using only the default motion may not satisfy the user's personalized requirements. For example, text "come on" corresponds to only one default motion, and the user cannot specify his/her designed motion for the virtual character at his/her own will.

Figure 3:
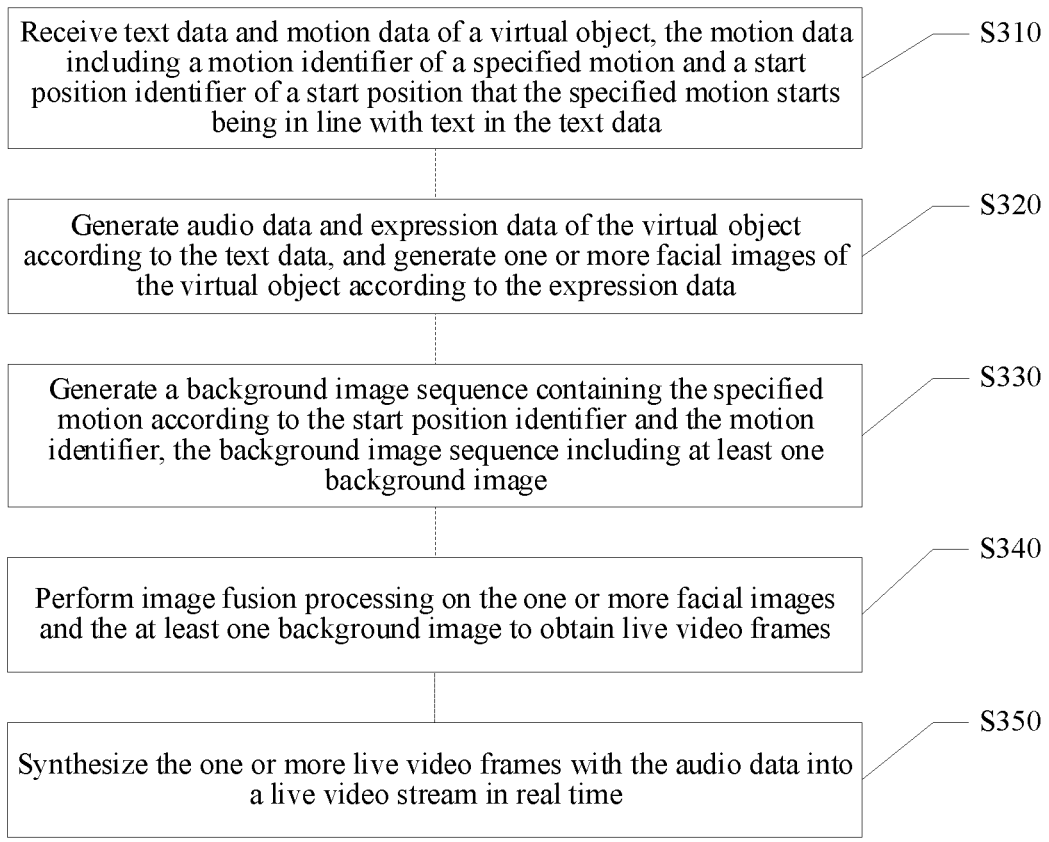
FIG. 3 schematically shows a flowchart of a method for processing a virtual video livestreaming according to an embodiment of the present disclosure.

Based on the above-mentioned one or more problems, this exemplary embodiment provides a method for processing a virtual video livestreaming. The method for processing a virtual video livestreaming may be applied to the above-mentioned server 105 or applied to one or more of the above-mentioned terminal devices 101, 102 and 103, which is not particularly limited in this exemplary embodiment. Referring to FIG. 3, the method for processing a virtual video livestreaming may include steps S310 to S350 below.

Step S310: Receive text data and motion data of a virtual object, the motion data including a motion identifier of a specified motion and a start position identifier of a start position that the specified motion starts being in line with text in the text data.

Step S320: Generate audio data and expression data of the virtual object according to the text data, and generate one or more facial images of the virtual object according to the expression data.

Step S330: Generate a background image sequence containing the specified motion according to the start position identifier and the motion identifier, the background image sequence including at least one background image.

Step S340: Perform image fusion processing on the one or more facial images and the at least one background image to obtain one or more live video frames.

Step S350: Synthesize the one or more live video frames with the audio data into a live video stream in real time.

In the method for processing a virtual video livestreaming provided by this exemplary embodiment, the audio data and the facial image of the virtual object can be generated according to the received text data, the background image containing the specified motion can be generated according to the acquired motion identifier and the start position identifier, and the facial image of the virtual object and the background image are subjected to image fusion processing to generate the live video frame; the live video stream can be synthesized in real time based on the live video frame and the audio data. On one hand, the motion data can be an object motion specified by a user for the virtual object, and the live video stream is generated according to the motion data, which can achieve the purpose of specifying a motion for the virtual object by the user in a virtual live video. On the other hand, a corresponding playing position of the specified motion and the text data is determined according to the motion identifier and the start position identifier, which makes the specified motion play at a specified position and can effectively solve the problem that motions of the virtual object do not match text.

Hereinafter, the above steps of this exemplary embodiment will be described in more detail.

In step S310, the text data and the motion data of the virtual object are received. The motion data includes the motion identifier of the specified motion and the start position identifier of a start position that the specified motion starts being in line with the text in the text data.

In this exemplary embodiment, the text data may be words that the virtual object will speak in the virtual live video. For example, the user may input the text data on his/her own through a livestreaming client. The user may also select corresponding text data from many selectable texts provided by the livestreaming client. The text data may also be text data stored in the server in advance. The virtual object may be a virtual image modeled in the virtual live video. The virtual object may be a character image, an animal image, a plant image or a virtual object of other things, etc. The virtual object is different from an object which really exists. For example, the virtual object may be a cartoon character image. The virtual object may also be an animal image such as a penguin, or a plant image such as a sunflower. The motion data is data that may be used to drive the virtual object to exhibit a corresponding motion. The specified motion may be a related motion that the user specifies the virtual object to execute or generate in the virtual video according to his/her own personalized requirements. The motion identifier may be an identifier of a certain particular specified motion. One specified motion may correspond to a unique identifier. The motion identifier may be represented by a motion-id. The start position identifier may be an identifier of a relative byte position at which the text corresponding to the specified motion starts in the text data. The start position identifier may be used for determining a position where the specified motion corresponds to the specific text data. For example, 10 words are included in the text data. When the virtual object is generated according to the text data, the virtual object will start to execute the specified motion from the 3$^{rd}$ word, and the start position identifier may be set to 3.

Figure 4:
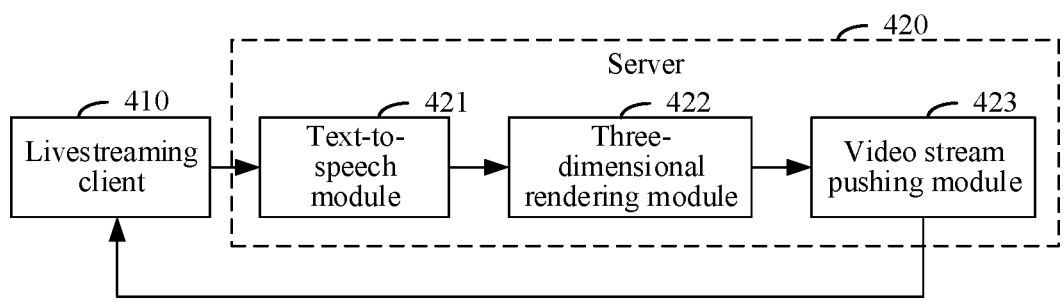
FIG. 4 schematically shows an overall framework diagram of a virtual video livestreaming service according to an embodiment of the present disclosure.

When performing virtual video livestreaming, a virtual video livestreaming server may firstly acquire (for example, receive) the text data and the motion data, and then perform corresponding processing on the acquired text data and motion data so as to generate a virtual live video. Referring to FIG. 4, FIG. 4 schematically shows an overall framework diagram of a virtual video livestreaming service according to an embodiment of the present disclosure. The virtual video livestreaming service may include a livestreaming client 410 and a virtual video livestreaming server 420. The virtual video livestreaming server 420 may include a text-to-speech module 421, a three-dimensional rendering module 422 and a video stream pushing module 423. The virtual video livestreaming server 420 may acquire the text data and the motion data through the livestreaming client 410. For example, the user may input or select corresponding text data and motion data through the livestreaming client. The virtual video livestreaming server 420 may also acquire text data and motion data stored in advance from a server database. After acquiring the text data and the motion data, the virtual video livestreaming server 420 may parse the text data and the motion data.

After the virtual video livestreaming server 420 parses the text data, a text length L of the text included in the text data may be obtained. For example, the text length may be 10 words. After parsing the motion data, the virtual video livestreaming server 420 may obtain the motion identifier of the specified motion and the start position identifier of a start position that the specified motion starts being in line with the text in the text data. For example, the start position identifier may be represented by index, index=I; the motion identifier may be: motion-id=D.

In step S320, the audio data and the expression data of the virtual object are generated according to the text data. The one or more facial images of the virtual object are generated according to the expression data.

In this exemplary embodiment, the expression data may be data related to a facial expression of the virtual object in the virtual video corresponding to the text data. The audio data may be human voice generated according to the text data for matching live video output images of the virtual object. The facial image may be a facial image of the virtual object outputted in the live video.

Referring to FIG. 4, after acquiring the text data and the motion data, the virtual video livestreaming server 420 may determine a target text corresponding to the text data, and perform text-to-speech processing on the target text via the text-to-speech module 421 to generate the audio data of the virtual object, and generate the expression data of the virtual object according to the audio data. After the expression data is obtained, the expression data may be rendered by the three-dimensional rendering module 422 to generate the facial image of the virtual object.

In step S330, the background image sequence containing the specified motion is generated according to the start position identifier and the motion identifier. The background image sequence includes at least one background image.

In this exemplary embodiment, the background image may be an image corresponding to the facial image of the virtual object and containing other features of the virtual object. For example, the background image may include limb motions of the virtual object and environmental background information when the virtual object is presented in the video. Since the user specifies a corresponding motion for some text data, the background image is an image containing the specified motion of the virtual object.

After determining the start position identifier and the motion identifier, the three-dimensional rendering module 422 in the virtual video livestreaming server 420 may determine a background image corresponding to the text data according to the text data, the start position identifier and the motion identifier, and the background image contains the specified motion so that the virtual object in the virtual live video may perform the specified motion.

In step S340, image fusion processing is performed on the one or more facial images and the at least one background image to obtain the one or more live video frames.

In this exemplary embodiment, the image fusion processing may refer to a process in which the facial image of the virtual object and the background image matched therewith are subjected to fusion processing to obtain the live video frame. The virtual live video may be generated according to the live video frame.

After generating the facial image and the background image of the virtual object, the virtual video livestreaming server 420 may perform image fusion processing on the facial image and the background image to form the complete live video frames one by one.

In step S350, the one or more live video frames are synthesized with the audio data into the live video stream.

In this exemplary embodiment, the live video stream may be a video stream synthesized in real time according to the live video frames and the audio data. The virtual video livestreaming server may push the live video stream to the client. The client may be the livestreaming client. The client may be used for receiving the live video stream, and presenting a virtual live video at the client in real time according to the live video stream.

Referring to FIG. 4, after receiving the live video frame and the audio data, the video stream pushing module 423 in the virtual video livestreaming server 420 may perform video synthesis processing (for example, including synchronization processing) on the live video frame and the audio data, synthesize the live video stream in real time, and push the live video stream into the livestreaming client 410, so that the livestreaming client 410 presents the virtual live video in real time according to the live video stream. The livestreaming client 410 acquires the live video stream and presents the virtual live video corresponding to the live video stream in real time, which can be realized by the following technical solutions. The virtual video livestreaming server 420 pushes the live video stream to a streaming media interface of a corresponding streaming media play address, so that the livestreaming client 410 pulls and takes the live video stream based on the streaming media play address, and presents the real-time synthesized virtual live video through a user interface of the livestreaming client 410.

For example, the audio data and the expression data of the virtual object may be generated according to the text data by the following steps.

In an exemplary embodiment of the present disclosure, target text for conversion (or text to be converted) is determined based on the text data; text-to-speech processing is performed on the target text to generate the audio data; and the expression data of the virtual object is generated according to the audio data.

The target text may be text to be subjected to text-to-speech processing. The target text may be original text contained in the text data and associated text associated with the original text. For example, in some human-computer interaction scenarios, when the original text in the text data is "how product A is used", the associated text may be text corresponding to the specific instruction for use of product A. Text-to-speech processing may be a process for converting the target text into a natural speech stream. The audio data may be corresponding audio generated after text-to-speech conversion processing of the target text.

For example, referring to FIG. 4, the virtual video livestreaming server 420 may perform text-to-speech processing on the target text via the text-to-speech module 421. The text-to-speech module 421 may contain a trained text-to-speech model. An initial deep learning text-to-speech model may be constructed in advance. A deep learning method is used for training the initial model. After model training is completed, the trained text-to-speech model is obtained. The text-to-speech model is used for processing the target text to generate the audio data.

In addition, the text-to-speech module 421 may also generate corresponding expression data according to the target text, which may be realized according to the following technical solution. A key point of the mouth of the virtual object in the virtual live video is predicted according to the audio data of the target text, and normalization processing is performed on the key point of the mouth so as to make the key point of the mouth adapt to a preset standard face template. Dimension reduction processing is performed on the normalized key point of the mouth to obtain mouth shape features corresponding to the virtual object. Semantic analysis is performed on the target text to obtain semantics represented by the target text. The expression data is determined according to the semantics represented by the target text and the mouth shape features of the virtual object. The key point of the mouth of the virtual object in the virtual live video is predicted according to the audio data of the target text. The key point of the mouth of the virtual object in the virtual live video may be predicted according to each syllable of the pronunciation of the target text. Various processing on the key point of the mouth by the text-to-speech module 421 is processing on the position of the key point of the mouth, and includes processing of on positions of the corners of the mouth, the positions of the middle points of the upper and lower lips, etc.

In an exemplary embodiment of the present disclosure, the target text is converted into a corresponding target word vector, and encoding processing and decoding processing are performed on the target word vector so as to generate audio features of the target word vector; and the audio features are synthesized to generate the audio data.

The target word vector may be a corresponding vector generated after vectorization processing is performed on the target text. The audio feature may be a key feature corresponding to the conversion of the target word vector into the audio data. For example, the audio feature may include a short time zero crossing rate, a short time energy, a spectrum centroid, etc.

For example, after the virtual video livestreaming server 420 determines the target text according to the text data, the target text may be inputted to the text-to-speech model by the text-to-speech module 421, and the target text is first converted into the corresponding target word vector. For example, when the target text is a sentence, the text-to-speech module 421 may perform word segmentation on the target text and determine a word vector corresponding to each word. After the target word vector is obtained, the text-to-speech module 421 may perform encoding processing on the target word vector to obtain intermediate semantics with an identifier (for example, a phoneme sequence with an identifier such as time information), then obtain the audio features of the target word vector by decoding processing, and perform synthesis processing on the obtained audio features using an audio synthesis algorithm so as to generate the audio data corresponding to the target text.

In an exemplary embodiment of the present disclosure, the virtual video livestreaming server 420 determines a number of expression image frames generated according to the expression data, and determines the number of the expression image frames as a first number; determines an image play frame rate, and determines a play duration of the expression data according to the first number and the image play frame rate, the play duration being the same as an audio duration of the audio data.

The number of the expression image frames is called an expression frame number. The image play frame rate may be a frequency (rate) at which bitmap images appear continuously on a display in units of frames. The image play frame rate may be determined, for example, according to the setting of a livestreaming application. The play duration of the expression data may be a time duration for playing the expression data. The audio duration may be a time duration for playing the audio data.

For example, after converting the target text into the corresponding expression data via the text-to-speech module 421, the number of the expression image frames contained in the expression data may be determined. For example, after converting the target text, the number of the expression image frames obtained may be N, namely, the first number is N. After the image play frame rate is determined, the play duration of the expression data may be determined according to the image play frame rate and the first number. In order to ensure that the mouth shape in the video in the finally generated virtual live video and the audio are aligned (namely, synchronized), when generating the audio data and the expression data, it is necessary to ensure that the audio duration of the audio data is the same as the play duration of the expression data.

In an exemplary embodiment of the present disclosure, the virtual video livestreaming server 420 acquires a default background image from a background image library; acquires a motion background image corresponding to the specified motion from a preset motion library according to the motion identifier; determines an image arrangement order of the default background image and the motion background image according to the start position identifier; and sorts the default background image and the motion background image according to the image arrangement order to generate a background image sequence.

The default background image may be a default background image provided in the background image library. For example, the default background image may be an image that includes only environmental background information of the virtual object and does not include any motion of the virtual object. The default background image may also be an image containing environmental background information and basic motions of the virtual object. The motion background image may be a background image containing the specified motion of the virtual object. The image arrangement order may be an arrangement order of all default background images and motion background images related to the processed text data and motion data.

For example, since a user may specify a corresponding motion for the virtual object for a portion of text in the text data, and another portion of text may not have the specified motion, the background image may include both the default background image and the motion background image. The three-dimensional rendering module 422 in the virtual video livestreaming server 420 may determine the background image corresponding to the text in the text data according to the start position identifier of a start position that the specified motion starts being in line with the text in the text data and the motion identifier of the specified motion.

Figure 5:
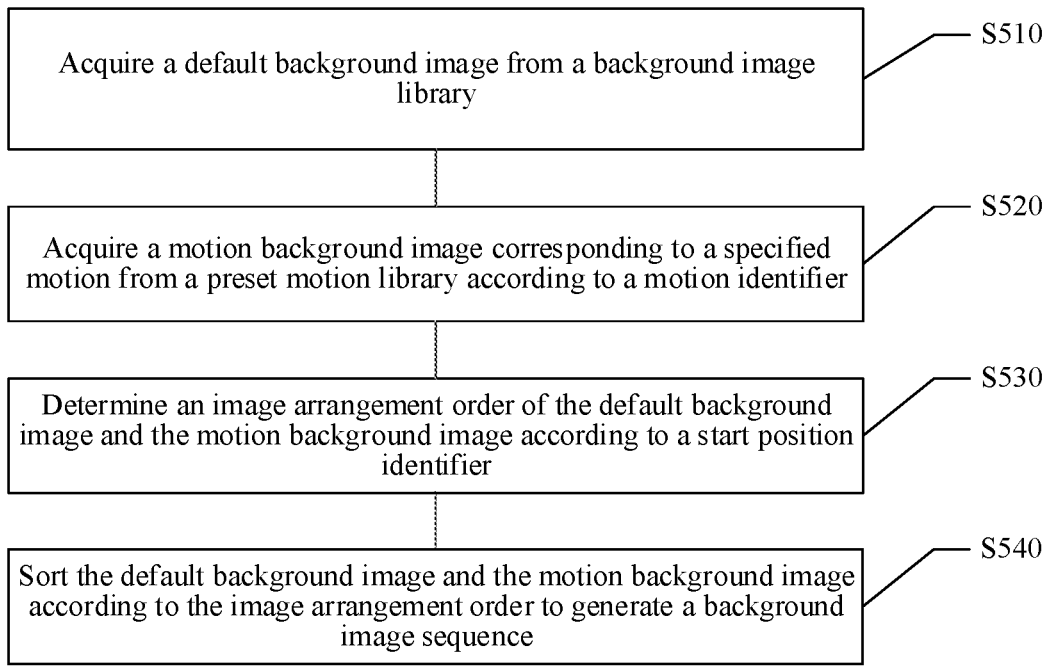
FIG. 5 schematically shows a flowchart for determining a background image sequence according to a motion identifier and a start position identifier according to an embodiment of the present disclosure.

Referring to FIG. 5, FIG. 5 schematically shows a flowchart for determining a background image according to a motion identifier and a start position identifier according to an embodiment of the present disclosure. In step S510, the default background image is acquired from the background image library. For example, the default background image may be acquired from the background image library. The default background image may be an image including basic motions such as beckoning, waving, nodding, shaking one's head, etc. For the part of text in the text data where the user does not specify the corresponding motion, the acquired default background image may be taken as the background image corresponding to the part of text. In step S520, with regard to the part of text corresponding to the specified motion in the text data, the motion background image corresponding to the specified motion may be acquired from the preset motion library according to the motion identifier of the specified motion. After the default background image and the motion background image are determined, the image arrangement order of these default background images and the motion background images may be determined according to the start position identifier of the specified motion in step S530. In step S540, a plurality of background images are sorted according to the image arrangement order, namely, the default background image and the motion background image are sorted to generate a background image sequence.

In an exemplary embodiment of the present disclosure, the virtual video livestreaming server 420 determines a motion sequence contained in the motion data, the motion sequence including one or more specified motions, and acquires a motion background image corresponding to each of the specified motions from the preset motion library according to the motion identifier.

The motion sequence may be a sequence composed of one specified motion or a plurality of specified motions. If a plurality of specified motions are included in the motion sequence, a motion order for the plurality of specified motions is included at the same time. The preset motion library may be an image library which stores the motion background image corresponding to the specified motion in advance.

For example, after acquiring the motion data, the virtual video livestreaming server 420 may determine the motion sequence contained in the motion data according to the motion identifier of the specified motion since the motion data includes the motion identifier of the specified motion. Additionally, the order of the specified motions in the motion sequence may be determined based on the order of the motion identifiers in the motion data. The data structure of the motion data acquired by the virtual video livestreaming server 420 may be "index: motion-id". Index may represent the start position identifier of a start position that the specified motion starts being in line with text in the text data. The motion background images stored in advance in the preset motion library are all storage forms bound by a motion identifier and a group of motion background images. After acquiring the motion identifier of the specified motion, the virtual video livestreaming server 420 may acquire a group of motion background images corresponding to the motion identifier one by one from the preset motion library according to the motion identifier.

In an exemplary embodiment of the present disclosure, the virtual video livestreaming server 420 determines a text length of text included in the text data; acquires a first number, and determines an identifier of a start frame of the motion background image according to the text length, the start position identifier and the first number; determines a number of motion background images as a number of motion images, and determines an identifier of an end frame of the motion background image according to the identifier of the start frame and the number of the motion images; and compares the identifier of the end frame with the first number in terms of magnitude to determine the image arrangement order according to a comparison result. The first number may be determined as described above.

The text length may be a length corresponding to the text data. For example, if the text included in the text data is "today is a peaceful and sunny day", the text length corresponding to the text data may be defined as 10 words. In addition, the length of the text data may also be defined according to the number of bytes occupied by the text data. For example, a Chinese character occupies two bytes. In this way of calculation, the text length corresponding to the above-mentioned text data is 20 bytes. The present disclosure does not specifically limit the manner in which the length of text is calculated. The frame identifier may be identifiers or numbers of a plurality of image frames corresponding to all the background images related to the processed text data and motion data. The identifier of the start frame may be a position identifier of a motion background image of a certain specified motion in all the background images, or a frame identifier or number of a first motion background image thereof. The number of the motion images may be a number of motion background images that the specified motion contains. The identifier of the end frame may be the frame identifier or number of the last motion background image of a certain specified motion. The identifier of the end frame of the motion background image of a certain specified motion may be determined according to the identifier of the start frame thereof and the number of the motion images. The comparison result may be a result obtained after comparing the identifier of the end frame with the first number in terms of magnitude. The first number may be determined as described above.

Figure 6:
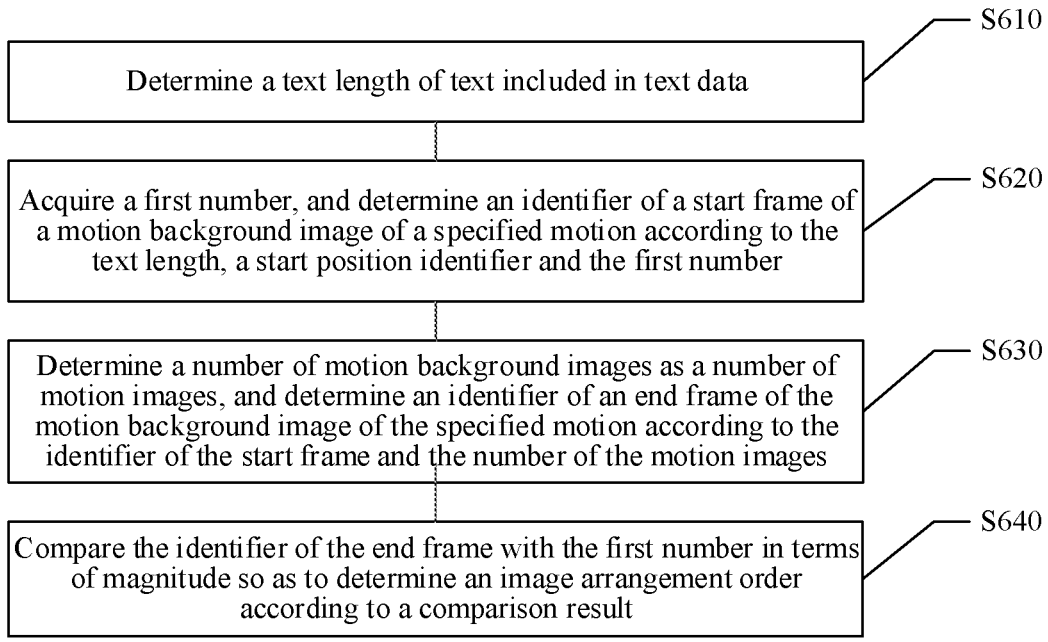
FIG. 6 schematically shows a flowchart for determining an image arrangement order according to a start position identifier according to an embodiment of the present disclosure.

Referring to FIG. 6, FIG. 6 schematically shows a flowchart for determining an image arrangement order according to a start position identifier according to an embodiment of the present disclosure. After acquiring text data, the virtual video livestreaming server 420 may determine a text length of text included in the text data in step S610. In step S620, a first number is acquired, and an identifier of a start frame of a motion background image of a specified motion may be determined according to the determined text length, the acquired start position identifier and the first number. Since a facial image of a virtual object may be correspondingly generated by rendering according to one frame of expression data, then the first number may be a number of facial images corresponding to the virtual object. Meanwhile, since the facial images of the virtual object are in one-to-one correspondence with background images, the number of the facial images of the virtual object is the same as a number of the background images, that is, the first number is also the number of the background images.

For example, the identifier of the start frame of the specified motion may be expressed as n. The first number may be expressed as N. The start position identifier may be expressed as I. The text length may be expressed as L. Then the identifier of the start frame may be calculated according to Formula 1, and 0<n<N+1.

$$n=N*I/L \quad \text{(Formula 1)}$$

In step S630, a number of motion background images is determined as a number of motion images, and an identifier of an end frame of the motion background image of the specified motion may be determined according to the identifier of the start frame and the number of the motion images. The number of the motion images may be represented by f. The identifier of the end frame may be represented by n−1+f. Since the background image may include a default background image, in step S640, the identifier of the end frame is compared with the first number in terms of magnitude, and then an image arrangement order of all the background images is determined according to a comparison result.

For example, the image arrangement order of the background image may be determined by the following steps.

In an exemplary embodiment of the present disclosure, if the comparison result is that the identifier of the end frame is less than or equal to the first number, the default background image is determined as a background image before the identifier of the start frame; the motion background image is determined as a background image between the identifier of the start frame and the identifier of the end frame; the default background image is determined as a background image between the identifier of the end frame and an identifier of the first number.

Since the background image includes the default background image and the motion background image, when the comparison result is that the identifier of the end frame is less than or equal to the first number, the background image corresponding to the part of text data for which the user does not set the specified motion may be configured as the default background image, and the background image of the part of text data corresponding to the specified motion is configured as the corresponding motion background image.

Figure 7:
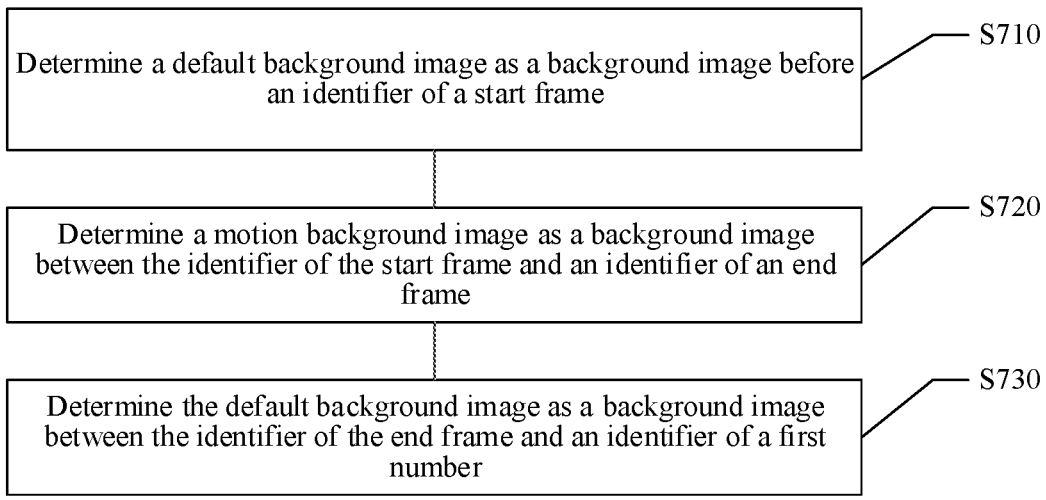
FIG. 7 schematically shows a flowchart for determining an image arrangement order according to an embodiment of the present disclosure.

Referring to FIG. 7, FIG. 7 schematically shows a flowchart for determining an image arrangement order according to an embodiment of the present disclosure. In step S710, a default background image is determined as a background image before an identifier of a start frame. In step S720, a motion background image may be determined as a background image between the identifier of the start frame and an identifier of an end frame. In step S730, the default background image may be determined as a background image between the identifier of the end frame and an identifier of a first number. That is, when n−1+f<=N, background images of the first n−1 frames of N background images are configured as the default background images; a background image from the $n^{th}$ frame to the $(n-1+f)^{th}$ frame is configured as the motion background image corresponding to a specified motion; and a background image from the $(n+f)^{th}$ frame to the $N^{th}$ frame is configured as the default background image. As can be seen from the foregoing description, the default background image and the motion background image correspond to text data and motion data. The motion background image (frames between an identifier of a start frame (or a start frame) and an identifier of an end frame (or an end frame)) corresponds to part of text in the text data corresponding to the specified motion. The default background image (frames before the identifier of the start frame (or the start frame) and frames after the identifier of the end frame or (the end frame)) corresponds to other text other than the part of text in the text data. In an exemplary embodiment of the present disclosure, if the motion data includes a current specified motion, a previous specified motion and a subsequent specified motion, an identifier of a current start frame and an identifier of a current end frame corresponding to the current specified motion are determined; the default background image is determined as a background image between an identifier of an end frame of the previous specified motion and the identifier of the current start frame; the motion background image is determined as a background image between the identifier of the current start frame and the identifier of the current end frame; and the default background image is determined as a background image between the identifier of the current end frame and an identifier of a start frame of the subsequent specified motion.

The current specified motion may be a specified motion currently processed. The previous specified motion may be a specified motion that precedes the current specified motion in sequence. The subsequent specified motion may be a specified motion immediately following the current specified motion. There are no other specified motions between the previous specified motion and the current specified motion. There are no other specified motions between the current specified motion and the subsequent specified motion, either. The identifier of the current start frame may be an identifier of the current specified motion at a start position in the background image (or an identifier of a start frame of a series of motion background images corresponding to the current specified motion). The identifier of the current end frame may be an identifier of the current specified motion at an end position in the background image (or an identifier of an end frame of a series of motion background images corresponding to the current specified motion). The identifier of the end frame of the previous specified motion may be an identifier of the previous specified motion at an end position in the background image (or an identifier of an end frame of a series of motion background images corresponding to the previous specified motion). The identifier of the start frame of the subsequent specified motion may be an identifier of the subsequent specified motion at a start position in the background image (or an identifier of a start frame of a series of motion background images corresponding to the subsequent specified motion). In the embodiment of the present disclosure, the frame identifier may also refer to a frame number.

Figure 8:
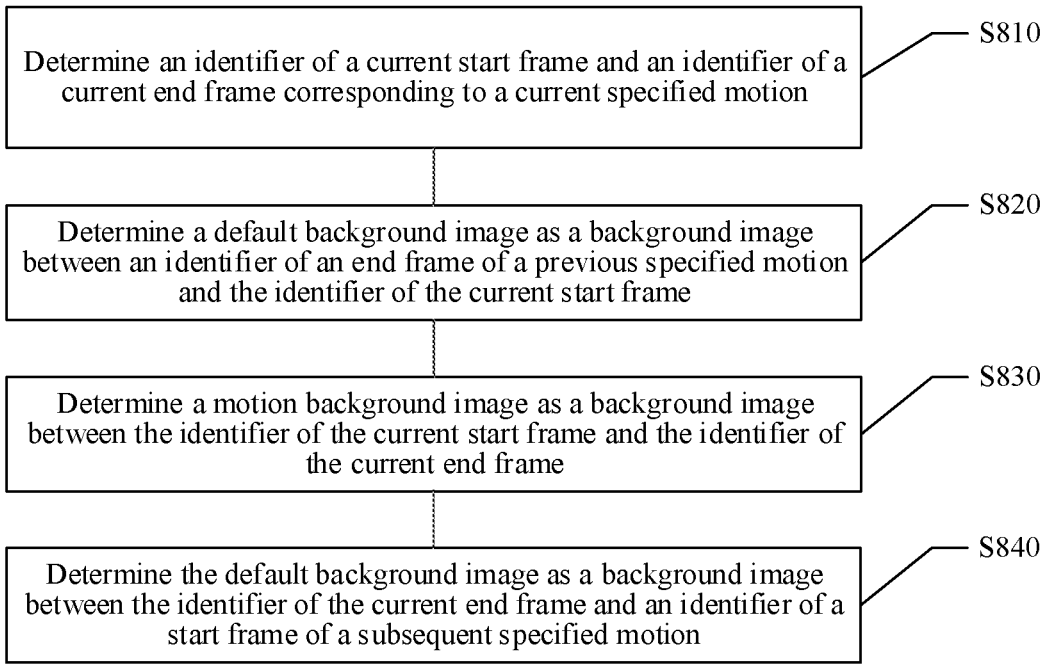
FIG. 8 schematically shows a flowchart for determining an image arrangement order according to another embodiment of the present disclosure.

The present disclosure takes three specified motions being included in motion data as an example for illustration. Referring to FIG. 8, FIG. 8 schematically shows a flowchart for determining an image arrangement order according to another embodiment of the present disclosure. In step S810, an identifier of a current start frame and an identifier of a current end frame corresponding to a current specified motion are determined. When the comparison result is that the identifier of the end frame is less than or equal to the first number, and the motion data includes a current specified motion, a previous specified motion and a subsequent specified motion, in step S820, a default background image is determined as a background image between an identifier of an end frame of the previous specified motion and the identifier of the current start frame. In step S830, a motion background image is determined as a background image between the identifier of the current start frame and the identifier of the current end frame. In step S840, the default background image is determined as a background image between the identifier of the current end frame and an identifier of a start frame of the subsequent specified motion. The background image between an identifier of a start frame of the previous specified motion and the identifier of the end frame of the previous specified motion is a series of motion background images corresponding to the previous specified motion. The background image between the identifier of the start frame of the subsequent specified motion and an identifier of an end frame of the subsequent specified motion is a series of motion background images corresponding to the subsequent specified motion.

In addition, if there is text before a part of text data corresponding to the previous specified motion, a background image corresponding to the part of text data (after a start frame of the series of motion background images corresponding to the previous specified motion) is configured as the default background image. Similarly, if there is text after a part of text data corresponding to the subsequent specified motion, a background image corresponding to the part of text data (after an end frame of the series of motion background images corresponding to the subsequent specified motion) is configured as the default background image.

When it is determined according to step S640 that the comparison result is that the identifier of the end frame is less than or equal to the first number, and the motion data includes specified motions of other numbers (such as 2, 4, 5, etc.), the configuration mode of the background image is similar to the above-mentioned mode, and the description thereof will not be repeated in the present disclosure.

In an exemplary embodiment of the present disclosure, if it is determined according to step S640 that the comparison result is that the identifier of the end frame is greater than the first number, a background image before the identifier of the start frame is configured as the default background image; a number of screening frames is determined according to the first number and the identifier of the start frame; a screened motion image set is determined from a plurality of motion background images according to the number of the screening frames; and a background image between the identifier of the start frame and an identifier of the first number is configured as the screened motion image set.

The number of the screening frames may refer to a number of images played in the virtual video by selecting a part of motion background images from all the motion background images corresponding to a specified motion. The screened motion image set may be the part of motion background images selected from all the motion background images corresponding to the specified motion. The screened motion image set may include one motion image or a plurality of motion images.

Figure 9:
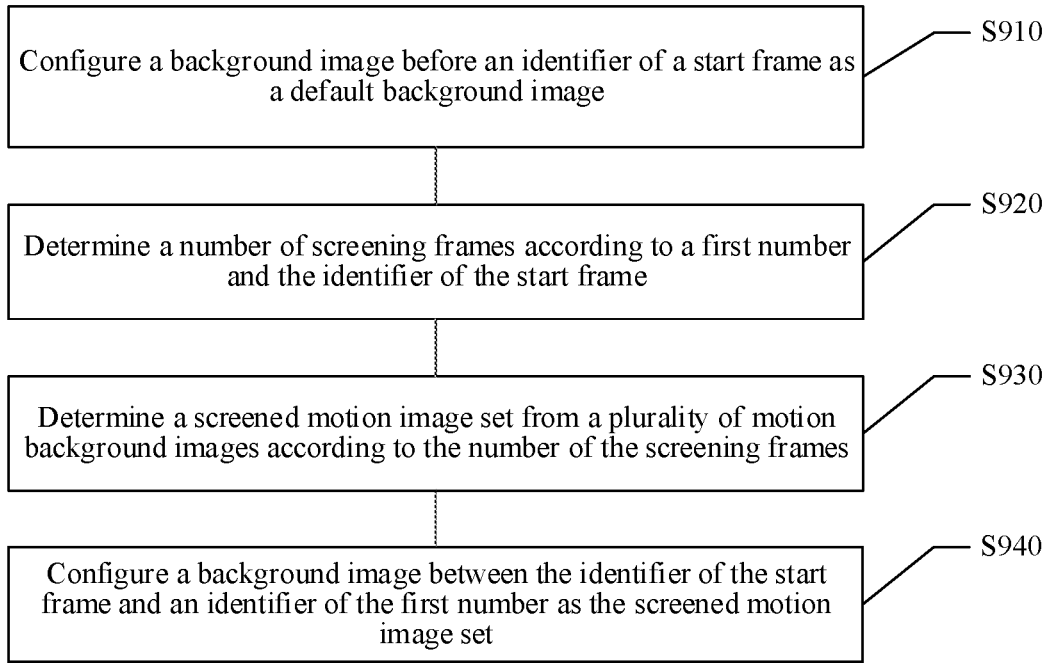
FIG. 9 schematically shows a flowchart for determining an image arrangement order according to yet another embodiment of the present disclosure.

Referring to FIG. 9, FIG. 9 schematically shows a flowchart for determining an image arrangement order according to yet another embodiment of the present disclosure. When it is determined according to step S640 that the comparison result is that the identifier of the end frame is greater than the first number, a background image corresponding to the part of text data for which the user does not set a specified motion may be configured as a default background image, and a background image corresponding to text data of the specified motion may be configured as a corresponding motion background image. Therefore, in step S910, a background image before an identifier of a start frame is configured as the default background image. However, when the identifier of the end frame is greater than the first number, if all the motion background images corresponding to the specified motion are played in the image order, end frames of the specified motion will exceed the first number, and it may occur that voice broadcasting of a virtual object has ended, but the virtual object still continues a corresponding motion. Therefore, a part of motion background images may be selected from the motion background images of the specified motion for playing.

With regard to the default background image, since text data before a part of text data corresponding to the specified motion does not have the corresponding specified motion, a background image corresponding to a part of text before the identifier of the start frame may be configured as the default background image, i.e., a background image of the previous n−1 frames is configured as the default background image. In step S920, a number of screening frames is determined according to the first number and the identifier of the start frame. Taking the text data corresponding to a specified motion as an example. An N−(n−1) frame motion background image may be played between the identifier of the start frame and an identifier of the first number. Therefore, the number of the screening frames may be determined as N−(n−1). In step S930, a screened motion image set is determined from a plurality of motion background images according to the number of the screening frames. For example, according to the number of screening frames, N−(n−1) motion background images may be selected from a plurality of motion background images corresponding to the specified motion as the screened motion image set. After the screened motion image set is determined, a background image between the identifier of the start frame and the identifier of the first number may be configured as the screened motion image set in step S940.

In an exemplary embodiment of the present disclosure, motion background images of the number of the screening frames are sequentially selected from a plurality of motion background images as a screened motion image set; or motion background images of the number of the screening frames are randomly selected from a plurality of motion background images as a screened motion image set.

The sequential selection may be a method of selecting the screened motion image set according to the order of the motion background images. The random selection may be a method of randomly selecting the screened motion image set from the motion background images.

For example, selecting the screened motion image set from the plurality of motion background images may be performed in two ways. After the number of the screening frames is determined, the motion background images of the number of the screening frames may be sequentially selected from the plurality of motion background images according to the number of the screening frames as the screened motion image set. For example, images of first N−(n−1) frames are sequentially selected from the motion background images of the specified motion as the screened motion image set. In addition, images of N−(n−1) frames may be randomly selected from the motion background images of the specified motion as the screened motion image set. It is also possible to randomly select images of N−(n−1) frames from the motion background images of the specified motion at a certain frame interval as the screened motion image set.

In an exemplary embodiment of the present disclosure, the virtual video livestreaming server 420 determines a background image matching the facial image as a matching background image, acquires an image fusion model constructed in advance, and performs image fusion processing on the facial image and the matching background image via the image fusion model to generate the live video frame.

The image fusion model may be a model for performing image fusion processing on the facial image and the background image of a virtual object.

For example, after the virtual video livestreaming server 420 obtains the facial image of the virtual object by rendering according to expression data of the virtual object through the three-dimensional rendering module 422, and obtains the background image according to the text data, a start position identifier and a motion identifier, a background image matching the facial image of each virtual object may be determined. The image fusion model constructed in advance is acquired. The image fusion model may be a convolution neural network (CNN) model. The facial image and the background image are inputted into the image fusion model. Image fusion processing may be performed on the facial image and the background image by the image fusion model to generate a complete video output image, namely, the live video frame.

Figure 10:
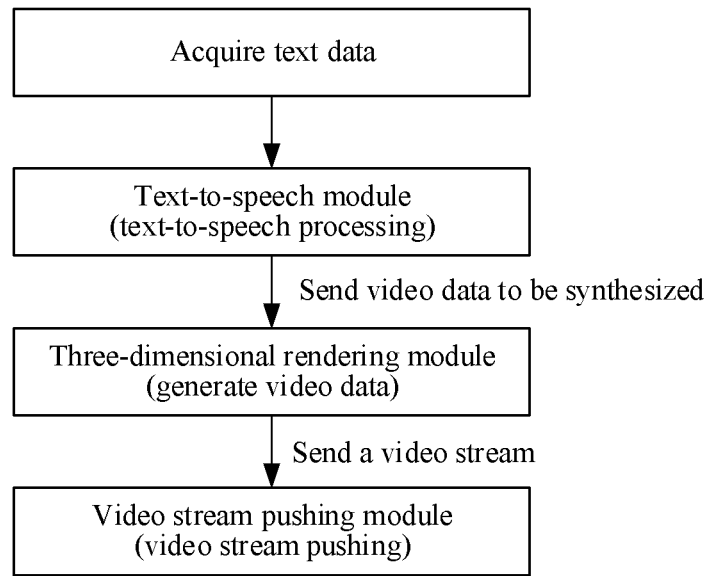
FIG. 10 schematically shows an implementation framework diagram of a virtual video stream pushing service according to an embodiment of the present disclosure.

Referring to FIG. 10, FIG. 10 schematically shows an implementation framework diagram of a virtual video stream pushing service according to an embodiment of the present disclosure. In FIG. 10, the virtual video stream pushing service may include a text-to-speech module, a three-dimensional rendering module and a video stream pushing module.

A livestreaming client sends text data and motion data to a virtual video livestreaming server. The virtual video livestreaming server may receive and parse the text data and the motion data, determine a text length of the text data and a motion identifier of a specified motion in the motion data and a start position identifier of a start position that the specified motion starts being in line with text in the text data.

After the virtual video livestreaming server determines target text based on the text data, the text-to-speech module may generate corresponding audio data and expression data according to the target text, package the audio data and the expression data into a data packet, and push the data packet to the three-dimensional rendering module. For example, the text-to-speech module may acquire the audio data and the expression data corresponding to the target text in a stream mode. When the text-to-speech module acquires the data packet containing the audio data and the expression data, the data packet is pushed to the three-dimensional rendering module. In addition, the virtual video livestreaming server may send the text length, the motion identifier of the specified motion and the start position identifier to the three-dimensional rendering module.

When receiving the data packet containing the expression data and the audio data, the three-dimensional rendering module may extract the expression data therein to perform three-dimensional rendering to obtain a set of corresponding facial images. The three-dimensional rendering module may determine background images corresponding to the text data according to the text length, the motion identifier of the specified motion and the start position identifier, the background image includes a default background image and a motion background image, and the background images are ordered. The virtual video livestreaming server may perform image fusion processing on each facial image and a background image matching the facial image to obtain a live video frame, and sends the live video frame and the audio data to the video stream pushing module.

When the video stream pushing module acquires the data packet pushed by the three-dimensional rendering module, the audio data and the live video frame therein may be extracted. The audio data and the live video frame are synthesized and processed by a fast forward moving picture expert group (FFMPEG) tool to generate a live video stream. The live video stream is synchronously pushed to a livestreaming client. Furthermore, the video stream pushing module may send an end signal to the client to end the current video stream pushing service, and disconnect communication connection with the livestreaming client.

Although the steps of the method in the present disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 11:
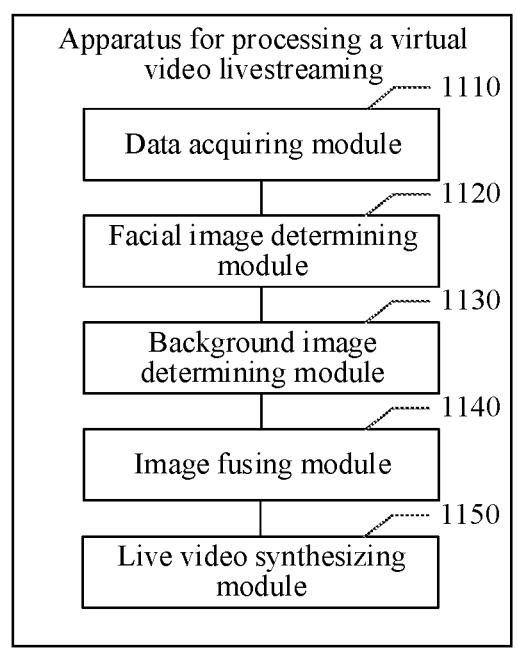
FIG. 11 schematically shows a structural diagram of an apparatus for processing a virtual video livestreaming according to an embodiment of the present disclosure.

Further, in this exemplary embodiment, an apparatus for processing a virtual video livestreaming is further provided. The apparatus for processing a virtual video livestreaming may be applied to a server or a terminal device. Referring to FIG. 11, the apparatus 1100 for processing a virtual video livestreaming may include a data acquiring module 1110, a facial image determining module 1120, a background image determining module 1130, an image fusing module 1140 and a live video synthesizing module 1150. The data acquiring module 1110 is configured to receive text data and motion data of a virtual object. The motion data includes a motion identifier of a specified motion and a start position identifier of a start position that the specified motion starts being in line with text in the text data. The facial image determining module 1120 is configured to generate audio data and expression data of the virtual object according to the text data, and generate one or more facial images of the virtual object according to the expression data. The background image determining module 1130 is configured to generate a background image sequence containing the specified motion according to the start position identifier and the motion identifier. The image fusing module 1140 is configured to perform image fusion processing on the one or more facial images and the at least one background image to obtain one or more live video frames. The live video synthesizing module 1150 is configured to synthesize the one or more live video frames with the audio data into a live video stream in real time.

In an exemplary embodiment of the present disclosure, the facial image determining module includes: a text determining unit, configured to determine corresponding target text based on the text data; an audio data generating unit, configured to perform text-to-speech processing on the target text to generate the audio data; and an expression data generating unit, configured to generate the expression data of the virtual object according to the audio data.

In an exemplary embodiment of the present disclosure, the audio data generating unit is configured to convert the target text into a corresponding target word vector, perform encoding processing and decoding processing on the target word vector so as to generate audio features of the target word vector, and synthesize the audio features to generate the audio data.

In an exemplary embodiment of the present disclosure, the expression data generating unit is configured to determine a number of expression image frames generated according to the expression data, and determine the number of the expression image frames as a first number; and determine an image play frame rate, and determine a play duration of the expression data according to the first number and the image play frame rate, the play duration being the same as an audio duration of the audio data.

In an exemplary embodiment of the present disclosure, the background image determining module includes: a default image acquiring unit, configured to acquire a default background image from a background image library; a motion image acquiring unit, configured to acquire a motion background image corresponding to the specified motion from a preset motion library according to the motion identifier; an image order determining unit, configured to determine an image arrangement order of the default background image and the motion background image according to the start position identifier; and an image arranging unit, configured to sort the default background image and the motion background image according to the image arrangement order to generate the background image sequence.

In an exemplary embodiment of the present disclosure, the motion image acquiring unit is configured to: determine a motion sequence contained in the motion data, the motion sequence including one or more specified motions; and acquire a motion background image corresponding to each of the specified motions from the preset motion library according to the motion identifier.

In an exemplary embodiment of the present disclosure, the image order determining unit further includes: a text length determining sub-unit, configured to determine a text length of text included in the text data; a start identifier determining sub-unit, configured to determine a number of expression image frames generated according to the expression data, determining the number of the expression image frames as a first number, and determining an identifier of a start frame of the motion background image according to the text length, the start position identifier and the first number; an end identifier determining sub-unit, configured to determine a number of the motion background images as a number of motion images, and determining an identifier of an end frame of the motion background image according to the identifier of the start frame and the number of the motion images; and an order determining sub-unit, configured to compare the identifier of the end frame with the first number in terms of magnitude so as to determine the image arrangement order according to a comparison result.

In an exemplary embodiment of the present disclosure, the order determining sub-unit includes a first order determining sub-unit, the first order determining sub-unit being configured to determine a background image before the identifier of the start frame as the default background image, determine a background image between the identifier of the start frame and the identifier of the end frame as the motion background image, and determine a background image between the identifier of the end frame and an identifier of the first number as the default background image.

In an exemplary embodiment of the present disclosure, the order determining sub-unit includes a second order determining sub-unit, the second order determining sub-unit being configured to determine an identifier of a current start frame and an identifier of a current end frame corresponding to a current specified motion, determine a background image between an identifier of an end frame of a previous specified motion and the identifier of the current start frame as the default background image, determine a background image between the identifier of the current start frame and the identifier of the current end frame as the motion background image, and determine a background image between the identifier of the current end frame and an identifier of a start frame of a subsequent specified motion as the default background image.

In an exemplary embodiment of the present disclosure, the order determining sub-unit includes a third order determining sub-unit, the third order determining sub-unit being configured to configure a background image before the identifier of the start frame as the default background image, determine a number of screening frames according to the first number and the identifier of the start frame, determine a screened motion image set from a plurality of the motion background images according to the number of the screening frames, and configure a background image between the identifier of the start frame and the identifier of the first number as the screened motion image set.

In embodiments of the present disclosure, "before an identifier of a certain frame" may also be understood as "before a certain frame", "after an identifier of a certain frame" may also be understood as "after a certain frame", and "between identifiers of frames" may also be understood as "between frames".

In an exemplary embodiment of the present disclosure, the third order determining sub-unit includes an image screening sub-unit, the image screening sub-unit being configured to sequentially select motion background images of the number of the screening frames from a plurality of the motion background images as the screened motion image set, or randomly select motion background images of the number of the screening frames from a plurality of the motion background images as the screened motion image set.

In an exemplary embodiment of the present disclosure, the image fusing module is configured to determine a background image matching the facial image as a matching background image, acquire an image fusion model constructed in advance, and perform image fusion processing on the facial image and the matching background image via the image fusion model to generate the live video frame.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The specific details of each module or unit in the above-mentioned apparatus for processing a virtual video livestreaming have been described in detail in the corresponding method for processing a virtual video livestreaming, and therefore will not be described in detail here.

Although a plurality of modules or units of a device configured to perform actions are discussed in the foregoing detailed description, such division is not mandatory. Actually, according to the implementations of the present disclosure, the features and functions of two or more modules or units described above may be specified in one module or unit. Conversely, features and functions of one module or unit described above may be further divided into a plurality of modules or units for implementation.

Other embodiments of the present disclosure will be apparent to a person skilled in the art from consideration of the specification and practice of the disclosure here. This application is intended to cover any variation, use, or adaptive change of the present disclosure. These variations, uses, or adaptive changes follow the general principles of the present disclosure and include common general knowledge or common technical means in the art that are not disclosed in the present disclosure. The specification and embodiments are merely regarded as exemplary, and the true scope and spirit of the present disclosure is indicated by the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A method for processing a virtual video livestreaming, comprising:
   receiving text data and motion data of a virtual object, the motion data comprising a motion identifier of a specified motion and a start position identifier of a start position that the specified motion starts being in line with text in the text data;
   generating audio data and expression data of the virtual object according to the text data, and generating a first number of expression image frames containing facial images of the virtual object according to the expression data;
   acquiring a motion background image corresponding to the specified motion from a preset motion library according to the motion identifier, the motion background image being a second number of motion background image frames;
   determining an identifier of a start frame of the motion background image according to the text data, the start position identifier and the first number;
   determining an identifier of an end frame of the motion background image according to the identifier of the start frame and the second number;
   comparing the identifier of the end frame with the first number;
   generating a background image sequence containing the specified motion according to the start position identifier and the motion identifier, the background image sequence comprising at least one background image, comprising:
   in response to the identifier of the end frame being greater than the first number, obtaining a screened motion image set by screening the second number of the motion background image frames based on the first number and the identifier of the start frame, and configuring a background image between the identifier of the start frame and an identifier of the first number as the screened motion image set; or
   in response to the identifier of the end frame being less than the first number, configuring the background image between the identifier of the start frame and the identifier of the first number as a combination of the motion background image and a default background image acquired from a background image library;
   performing image fusion processing on the facial images and the at least one background image to obtain one or more live video frames; and
   synthesizing the one or more live video frames with the audio data into a live video stream in real time.

2. The method according to claim 1, wherein generating the audio data and expression data of the virtual object according to the text data comprises:
   determining target text for conversion based on the text data;
   performing text-to-speech processing on the target text to generate the audio data; and
   generating the expression data of the virtual object according to the audio data.

3. The method according to claim 2, wherein performing the text-to-speech processing on the target text to generate the audio data comprises:
   converting the target text into a target word vector, encoding the target word vector to obtain intermediate semantics, and decoding the intermediate semantics to generate audio features of the target word vector; and
   synthesizing the audio features to generate the audio data.

4. The method according to claim 2, further comprising:
   determining a number of expression image frames generated according to the expression data, and determining the number of the expression image frames as a first number; and
   determining an image play frame rate, and determining a play duration of the expression data according to the first number and the image play frame rate, the play duration being the same as an audio duration of the audio data.

5. The method according to claim 1, wherein generating the background image sequence containing the specified motion according to the start position identifier and the motion identifier comprises:
   determining an image arrangement order of the default background image and the motion background image according to the start position identifier; and
   sorting the default background image and the motion background image according to the image arrangement order to generate the background image sequence.

6. The method according to claim 5, further comprising:
determining a motion sequence contained in the motion data, the motion sequence comprising one or more specified motions; and
acquiring the motion background image corresponding to each of the specified motions from the preset motion library according to the motion identifier.

7. The method according to claim 1, further comprising determining a text length of text comprised in the text data; and
determining the identifier of the start frame of the motion background image according to the text length, the start position identifier and the first number.

8. The method according to claim 1, further comprising: in response to the identifier of the end frame being less than the first number:
determining the default background image as a background image before the identifier of the start frame;
determining the motion background image as a background image between the identifier of the start frame and the identifier of the end frame; and
determining the default background image as a background image between the identifier of the end frame and an identifier of the first number.

9. The method according to claim 8, wherein the motion data comprises a current specified motion, a previous specified motion and a subsequent specified motion, and determining the image arrangement order according to the comparison result further comprises:
determining an identifier of a current start frame and an identifier of a current end frame corresponding to the current specified motion;
determining the default background image as a background image between an identifier of an end frame of the previous specified motion and the identifier of the current start frame;
determining the motion background image as a background image between the identifier of the current start frame and the identifier of the current end frame; and
determining the default background image as a background image between the identifier of the current end frame and an identifier of a start frame of the subsequent specified motion.

10. The method according to claim 1, further comprising: in response to the identifier of the end frame being greater than the first number comprises:
configuring a background image before the identifier of the start frame as the default background image;
determining a number of screening frames according to the first number and the identifier of the start frame;
determining a screened motion image set from a plurality of the motion background images according to the number of the screening frames; and
configuring a background image between the identifier of the start frame and the identifier of the first number as the screened motion image set.

11. The method according to claim 10, wherein determining the screened motion image set from a plurality of the motion background images according to the number of the screening frames comprises:
sequentially selecting motion background images of the number of the screening frames from a plurality of the motion background images as the screened motion image set; or
randomly selecting motion background images of the number of the screening frames from a plurality of the motion background images as the screened motion image set.

12. The method according to claim 1, wherein performing the image fusion processing on the facial images and the at least one background image to obtain the one or more live video frames comprises:
determining a background image matching the facial image as a matching background image;
acquiring an image fusion model constructed in advance; and
performing image fusion processing on the facial image and the matching background image via the image fusion model to generate the live video frame.

13. An electronic device, comprising:
a processor and
a memory, the memory storing computer-readable instructions, and the computer-readable instructions, when being executed, cause the processor to implement:
receiving text data and motion data of a virtual object, the motion data comprising a motion identifier of a specified motion and a start position identifier of a start position that the specified motion starts being in line with text in the text data;
generating audio data and expression data of the virtual object according to the text data, and generating a first number of expression image frames containing facial images of the virtual object according to the expression data;
acquiring a motion background image corresponding to the specified motion from a preset motion library according to the motion identifier, the motion background image being a second number of motion background image frames;
determining an identifier of a start frame of the motion background image according to the text data, the start position identifier and the first number;
determining an identifier of an end frame of the motion background image according to the identifier of the start frame and the second number;
comparing the identifier of the end frame with the first number;
generating a background image sequence containing the specified motion according to the start position identifier and the motion identifier, the background image sequence comprising at least one background image, comprising:
in response to the identifier of the end frame being greater than the first number, obtaining a screened motion image set by screening the second number of the motion background image frames based on the first number and the identifier of the start frame, and configuring a background image between the identifier of the start frame and an identifier of the first number as the screened motion image set; or
in response to the identifier of the end frame being less than the first number, configuring the background image between the identifier of the start frame and the identifier of the first number as a combination of the motion background image and a default background image acquired from a background image library;
performing image fusion processing on the one or more facial images and the at least one background image to obtain one or more live video frames; and synthesizing the one or more live video frames with the audio data into a live video stream in real time.

14. The device according to claim 13, wherein generating the audio data and expression data of the virtual object according to the text data comprises:
determining target text based on the text data;
performing text-to-speech processing on the target text to generate the audio data; and
generating the expression data of the virtual object according to the audio data.

15. The device according to claim 14, wherein the processor is further configured to implement:
determining a number of expression image frames generated according to the expression data, and determining the number of the expression image frames as a first number; and
determining an image play frame rate, and determining a play duration of the expression data according to the first number and the image play frame rate, the play duration being the same as an audio duration of the audio data.

16. The device according to claim 13, wherein performing the text-to-speech processing on the target text to generate the audio data comprises:
converting the target text into a target word vector, encoding the target word vector to obtain intermediate semantics, and decoding the intermediate semantics to generate audio features of the target word vector; and
synthesizing the audio features to generate the audio data.

17. The device according to claim 13, wherein the processor is further configured to implement:
determining an image arrangement order of the default background image and the motion background image according to the start position identifier; and
sorting the default background image and the motion background image according to the image arrangement order to generate the background image sequence.

18. The device according to claim 17, wherein the processor is further configured to implement:
determining a text length of text comprised in the text data; and
determining the identifier of the start frame of the motion background image according to the text length, the start position identifier and the first number.

19. The device according to claim 13, wherein the processor is further configured to implement:
determining a motion sequence contained in the motion data, the motion sequence comprising one or more specified motions; and
acquiring the motion background image corresponding to each of the specified motions from the preset motion library according to the motion identifier.

20. A non-transitory computer-readable storage medium, storing a computer program, the computer program, when being executed, cause a processor to implement a method for processing a virtual video livestreaming, the method comprising:
receiving text data and motion data of a virtual object, the motion data comprising a motion identifier of a specified motion and a start position identifier of a start position that the specified motion starts being in line with text in the text data;
generating audio data and expression data of the virtual object according to the text data, and generating a first number of expression image frames containing facial images of the virtual object according to the expression data;
acquiring a motion background image corresponding to the specified motion from a preset motion library according to the motion identifier, the motion background image being a second number of motion background image frames;
determining an identifier of a start frame of the motion background image according to the text data, the start position identifier and the first number;
determining an identifier of an end frame of the motion background image according to the identifier of the start frame and the second number;
comparing the identifier of the end frame with the first number;
generating a background image sequence containing the specified motion according to the start position identifier and the motion identifier, the background image sequence comprising at least one background image, comprising:
in response to the identifier of the end frame being greater than the first number, obtaining a screened motion image set by screening the second number of the motion background image frames based on the first number and the identifier of the start frame, and configuring a background image between the identifier of the start frame and an identifier of the first number as the screened motion image set; or
in response to the identifier of the end frame being less than the first number, configuring the background image between the identifier of the start frame and the identifier of the first number as a combination of the motion background image and a default background image acquired from a background image library;
performing image fusion processing on the one or more facial images and the at least one background image to obtain one or more live video frames; and
synthesizing the one or more live video frames with the audio data into a live video stream in real time.

* * * * *